US00RE47777E

(19) United States
(12) Reissued Patent
Kaiser

(10) Patent Number: US RE47,777 E
(45) Date of Reissued Patent: Dec. 24, 2019

(54) TRAFFIC SURFACE CONSTRUCTION COMPRISING AT LEAST ONE INTERMEDIATE LAYER

(71) Applicant: DENSO-HOLDING GMBH & CO, Leverkusen (DE)

(72) Inventor: Thomas Markus Kaiser, Inden (DE)

(73) Assignee: DENSO-HOLDING GMBH & CO, Leverkusen (DE)

(21) Appl. No.: 15/883,510

(22) Filed: Jan. 30, 2018

Related U.S. Patent Documents

Reissue of:
(64) Patent No.: 9,493,914
Issued: Nov. 15, 2016
Appl. No.: 14/930,125
Filed: Nov. 2, 2015

U.S. Applications:
(63) Continuation of application No. PCT/EP2014/001180, filed on May 2, 2014.

(30) Foreign Application Priority Data

May 2, 2013 (DE) ..... 10 2013 007 449

(51) Int. Cl.
*E01C 7/32* (2006.01)
*C08G 18/83* (2006.01)
(Continued)

(52) U.S. Cl.
CPC ..... *E01C 7/325* (2013.01); *C08G 18/837* (2013.01); *C08G 65/336* (2013.01); *C08L 71/00* (2013.01); *C08L 95/00* (2013.01); *C08L 101/10* (2013.01)

(58) Field of Classification Search
CPC ..... E01C 7/325; C09D 201/10; C08G 65/336; C08G 18/837; C08L 71/00; C08L 95/00; C08L 101/10
See application file for complete search history.

(56) References Cited

U.S. PATENT DOCUMENTS 4,231,830 A * 11/1980 Ryan et al. ..... B29C 70/64 156/232
4,265,957 A * 5/1981 Severance ..... E04F 15/12 404/82

(Continued)

FOREIGN PATENT DOCUMENTS

AT 205743 B 10/1959
AT 005560 U1 8/2002

(Continued)

OTHER PUBLICATIONS

International Search Report dated Sep. 5, 2014, International Application No. PCT/EP2014/001180.

*Primary Examiner* — Jerry D Johnson
(74) *Attorney, Agent, or Firm* — Dinsmore & Shohl LLP

(57) ABSTRACT

An economical, permanent construction of traffic surfaces that does not require an extensive use of resources and that is cost-effective to produce, and in particular that of protecting the parts of the bound and unbound layers of the traffic surface construction that lie beneath the surface layer of the carriageway from the ingress of water. A construction comprising at least one base layer, at least one asphalt surface layer and at least one intermediate layer applied to the at least one base layer, said at least one intermediate layer comprising a material that contains at least one silane-terminated polymer.

13 Claims, 1 Drawing Sheet

(51) Int. Cl.

| | |
|---|---|
| ***C08G 65/336*** | (2006.01) |
| ***C08L 71/00*** | (2006.01) |
| ***C08L 95/00*** | (2006.01) |
| ***C08L 101/10*** | (2006.01) |

(56) References Cited

U.S. PATENT DOCUMENTS

| | | | | |
|---|---|---|---|---|
| 5,536,569 | A * | 7/1996 | Lasch | 359/540 |
| 7,232,276 | B2 * | 6/2007 | Oka | E01C 3/06 404/31 |
| 7,452,930 | B2 * | 11/2008 | Kawakami | C08L 95/00 524/59 |
| 8,702,343 | B1 * | 4/2014 | Vitale | E01C 7/358 404/17 |
| 2003/0086762 | A1 * | 5/2003 | Oka | E01C 3/06 404/18 |
| 2007/0253773 | A1 * | 11/2007 | Huang | E01C 11/005 404/35 |
| 2011/0206455 | A1 * | 8/2011 | Blacklidge | E01C 7/185 404/17 |
| 2013/0156501 | A1 * | 6/2013 | Hemphill | E01C 11/005 404/75 |
| 2013/0195552 | A1 * | 8/2013 | McDade | E01C 7/187 404/75 |
| 2014/0037377 | A1 * | 2/2014 | Lee | E01C 7/187 404/82 |
| 2014/0112717 | A1 * | 4/2014 | Yu | E01C 11/16 404/72 |
| 2014/0234027 | A1 * | 8/2014 | Morris | C08L 95/005 404/75 |

FOREIGN PATENT DOCUMENTS

| | | | |
|---|---|---|---|
| DE | 4339113 | A1 | 3/1994 |
| DE | 10153983 | A1 | 5/2003 |
| DE | 102004003989 | A1 | 8/2005 |
| DE | 102006006973 | A1 | 8/2007 |
| EP | 1283309 | A1 | 2/2003 |
| EP | 1705290 | A2 | 9/2006 |
| JP | 2005126998 | A | 5/2005 |
| JP | 2012149457 | A | 8/2012 |
| WO | 9525076 | A1 | 9/1995 |
| WO | 2005071165 | A1 | 8/2005 |
| WO | 2006041560 | A1 | 4/2006 |

* cited by examiner

TRAFFIC SURFACE CONSTRUCTION COMPRISING AT LEAST ONE INTERMEDIATE LAYER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation of PCT/EP2014/001180 filed May 2, 2014, which claims priority of German Patent Application DE 10 2013 007 449.5 filed May 2, 2013.

FIELD OF THE INVENTION

The present invention relates to a traffic surface construction comprising at least one base layer, at least one asphalt surface layer and at least one intermediate layer, wherein the intermediate layer is applied to the at least one base layer, as well as to the use of a material for the production of the at least one intermediate layer.

BACKGROUND OF THE INVENTION

Traffic surfaces, in particular for freeways, but also other traffic surfaces, including parking lots, etc. are produced, for example, in the manner of conventional concrete constructions. These are composed, in particular, of a construction having at least two layers, with a base construction for a street, in particular a concrete sub-base and a high-quality concrete surface, wherein, preferably, the concrete surface includes crushed aggregate, which poses no problems regarding the alkali-silicic acid reaction, as well as a high cement content. The concrete surface is relatively complex to produce, because it must be produced with a low-noise, non-slip and durable surface texture.

The concrete construction of this type of traffic surface produced in the manner of conventional concrete construction requires high compressive strength as well as high tearing and bending tensile strengths. With the increasing traffic loads, the thickness of the concrete road surface must also be increased, and measures must be taken against susceptibility to cracking. Such measures comprise, for example, a provision, reinforcement, or the addition of measures against collapse.

As an alternative to the conventional concrete construction, traffic surfaces are produced from concrete by means of seamless, single layer continuous reinforced concrete road surfaces. A concrete road surface of this type is subsequently provided with a thin asphalt surface layer. A bituminous adhesive layer is disposed between the concrete road surface and the asphalt surface layer, in order to provide a sufficient adhesion of the asphalt surface layer onto the seamless concrete road surface.

While the costs are relatively high with the conventional concrete construction described in the introduction, having a concrete sub-base and a concrete surface, in particular the material and production costs, due to the high-quality concrete surface and the two-layer installation having two concrete pavements, with a surface texture of the concrete surface that is to be produced separately in a further installation step, it is disadvantageous with the alternative described below, using a seamless concrete road surface, that the thickness of the adhesive layer decreases, because the bitumen contained therein rises into the asphalt surface layer, at least in part. As a result, the adhesion of the asphalt upper layer to the seamless concrete road surface decreases, crack formation occurs, in particular in cold weather, and subsequent erosion caused by water is combined with a partial flaking of the asphalt surface layer.

SUMMARY OF THE INVENTION

A traffic surface construction having at least one asphalt upper layer and at least one intermediate layer, which is applied to the at least one base layer, the at least one intermediate layer having a material with at least one silane terminated polymer. The at least one silane terminated polymer is selected from a group comprising polyethylene and/or polypropylene oxide, also having urethane segments, and/or polyurethane. The quantity of the at least one silane terminated polymer ranges from approx. 20% by weight to approx. 70% by weight, in relation to the entire quantity of the material. The at least one silane terminated polymer further may have terminal methoxy, ethoxy, and/or propoxy groups.

BRIEF DESCRIPTION OF THE DRAWINGS

By means of the following examples, these and other advantages are explained in more detail. It is shown.

DETAILED DESCRIPTION OF THE INVENTION

Figure 1:
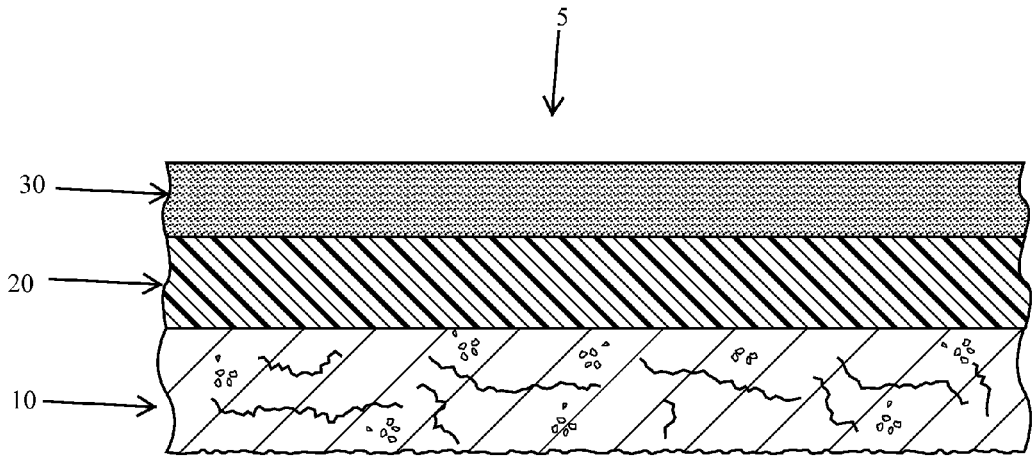
FIG. 1 is sectioned view showing the base layer, intermediate layer and an upper layer of the traffic surface construction.
Figure 2:
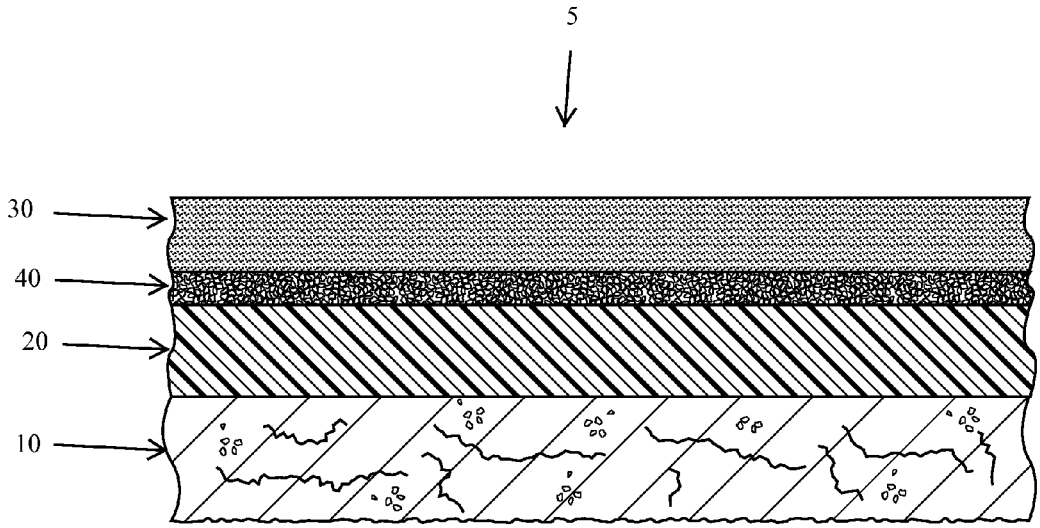
FIG. 2 is a sectioned view showing the base layer, intermediate layer, aggregate layer and an upper layer of the traffic surface construction.

It is therefore the object of the invention to provide a traffic surface construction 5, which, on one hand, can be produced inexpensively, and on the other hand, provides an at least improved protection, in particular, of the at least one base layer, in particular the load-bearing substructure of a street, from an ingress of water and potential erosion.

This object is achieved in accordance with the invention by means of a traffic surface construction 5 comprising at least one base layer 10, at least one asphalt upper layer 30, and at least one intermediate layer 20, which is applied to the at least one base layer bonded thereto, wherein the at least one asphalt surface layer 30 is preferably disposed on the intermediate layer 20, and wherein the at least one intermediate layer 20 comprises a material comprising at least one silane terminated polymer, or is produced from a material comprising at least one silane terminated polymer, respectively. The intermediate layer is preferably designed to be elastic. It is further preferred that the intermediate layer 20 exhibits crack-bridging properties. Cracks, as set forth in the present invention, have a width of at least approx. 0.1 mm, more preferably in a range of approx. 0.5 mm to approx. 1.0 mm. The cracks have a length of at least approx. 0.5 cm, more preferably a length in the range of approx. 1 cm to approx. 20 cm. The cracks are disposed, in particular, in the at least one base layer 10, in order that no larger tensile stresses can occur when subjected to traffic loads. Preferably the at least one intermediate layer 20 is free of bitumen, meaning that it contains no bitumen at all.

The at least one base layer 10, as set forth in the present invention, is preferably an at least partially bonded base layer 10, more preferably a completely bonded base layer 10. The bonding can occur thereby through the addition of binders such as cement, lime and/or bitumen. It is particularly preferred that the at least one base layer 10 exhibit a limited tensile stress. For this, the at least one base layer 10 preferably contains cracks complying with the definition above. Slabs are preferably formed thereby, having an edge length of less than or equal to 2.5 m. The at least one base layer 10 can be composed of concrete and/or asphalt, in particular.

The at least one intermediate layer 20 can be applied to at least a newly produced base layer 10 when new traffic surfaces are being produced. The at least one intermediate layer 20 can however also be used in repairing or restoring or reconditioning of traffic surfaces. For this, the at least one intermediate layer 20 can be applied, for example, to a base layer 10 of concrete, wherein the concrete layer can be made available, for example, through a concrete surface or a substructure made of a concrete sub-base. The concrete layer is preferably de-tensioned through the use of a polygonal roller, which is pulled over the concrete layer by a towing machine, thus causing cracks to be formed in the concrete layer. As a result, the tensile stress is reduced, while at the same time, the compressive strength of the concrete layer remains substantially preserved. It may also be provided thereby that first a milling of the surface of the concrete layer is carried out, and subsequently this is broken up, as described. Alternatively, it is possible in the case of asphalt surface layers to mill these, to grind down the asphalt milling product, to add a binder, in particular cement, lime or bitumen, and then to roll it out flat again. Because of the grinding step, base layers of this type, as set forth in the present invention, likewise exhibit low tensile stress, while still exhibiting a high compressive strength. The at least one intermediate layer 20 can be applied to a base layer 10 produced in this manner.

The at least one intermediate layer 20 is made from a low viscosity material, which is applied in liquid form. The low viscosity material is a single component material, such that it can be processed easily. It contains no bitumen or asphalt. In particular, it also contains no medium or large sized aggregate, such that no hollow spaces are present in the low viscosity material, such that in the end, an intermediate layer 20 can be produced therewith, which is practically or entirely free of hollow spaces. The intermediate layer 20 can advantageously be applied with a typical road paver.

The traffic surface construction 5 according to the invention has the major advantage that, with a new production of a traffic surface of this type, for example, a simple concrete that exhibits a sufficient compressive strength, also in the form of a seamless concrete layer, can be used for the at least one base layer 10. This simple concrete is advantageously de-tensioned, in order to reduce tensile stresses present therein, wherein a reduction, for example, of tensile stress can also already take place through the provision of a specific concrete mixture that cracks readily in the dried state, or through driving over a prepared concrete layer with a suitable roller or suchlike. The at least one intermediate layer 20 is then applied to this at least one base layer 10 made of concrete, onto which at least one asphalt upper layer 30, in particular an asphalt surface coarse, which can have a reduced thickness. A sufficient protection against ingress of water, and at the same time, a sufficient adhesion, on one hand, to the at least one asphalt upper layer 30 as well as the at least one base layer 10, is provided. By using a simple concrete for the at least one base layer 10, as well as a reduced thickness of the asphalt surface structure through the at least one asphalt upper layer 30, in particular the asphalt surface layer, the material costs for the traffic surface according to the invention are significantly reduced in comparison to conventional constructions. Furthermore, the production costs are also reduced because the application of the at least one intermediate layer can be accomplished more easily, and a complex texturing of the surface of a concrete roadway, for example, is not necessary. It is particularly preferred that an aggregate or a rubber granulate 40 be applied to the at least one intermediate layer 20, in order to make available a more improved interlocking and adhesion to the at least one asphalt upper layer 30.

The at least one asphalt upper layer 30 as set forth in the present invention can be referred to as an asphalt surface layer when only exactly one asphalt upper layer is used. As set forth in the present invention, more than at least one asphalt upper layer 30 may be used, however, wherein that layer that forms the actual traffic surface with its upper surface, and which comes in direct contact with vehicles driving over it, is to be referred to as the asphalt surface layer.

The traffic surface construction 5 according to the invention is preferably exactly three-layered, and has a base layer 10, an intermediate layer 20 disposed thereon, and an asphalt upper layer 30, referred to as an asphalt surface layer. The traffic surface construction according to the invention is advantageously distinguished in that the intermediate layer 20 is bonded directly to the asphalt upper layer 30. Furthermore, the intermediate layer 20 is advantageously bonded to the at least one base layer 10, wherein numerous base layers may also be present. Preferably, exactly one base layer 10 of concrete is provided, wherein the concrete is de-tensioned in terms of tensile stresses. The asphalt upper layer 30, disposed directly on the intermediate layer 20, is advantageously designed as a single layer, and can be applied significantly more thinly directly to the intermediate layer 20, preferably in a thickness ranging from approx. 1.5 cm to approx. 4 cm, more preferably in a range of approx. 2 cm to approx. 3 cm. The construction according to the invention can also be realized in the framework of repairs or subsequent providing of existing structures with the traffic surface construction according to the invention in its full or partial application.

The silane terminated polymer of the material used for the production of the intermediate layer 20 is preferably selected from a group comprising polyethylene oxide and/or polypropylene oxide, or having urethane segments, and/or polyurethane. The at least one silane terminated polymer is advantageously a polyether, and it is particularly preferred that it is a methoxy or ethoxy terminated silane, which can, more preferably, have at least one, preferably exactly one, urethane group on each end between the polyether portion and the silane group. Such urethane groups are regarded as urethane segments in the context of the present invention, which are preferably present in the aforementioned silane terminated polymers.

Preferably, the silane terminated polymer is formed from a polyether group composed of a polyethylene oxide and/or a polypropylene oxide, which is terminated with an alkoxy dialkyl silyl alkyl carbamate group, dialkoxy alkyl silyl alkyl carbamate group and/or trialkoxy silyl alkyl carbamate group. It is particularly preferred that the polyethylene oxide and/or the polypropylene oxide used as a polyether is terminated by identical silyl alkyl carbamate groups, such as those described above. It is particularly preferred that an end termination occurs by means of a dimethoxy or diethoxy methyl silyl methyl or propyl carbamate group. It is preferred that the silane terminated polymer according to the present invention is designed such that both terminal hydroxide groups of the polyethylene and/or polypropylene oxide are adjacent to exactly one urethane group, which is connected to a mono-, di- or tri-substituted silyl remainder via a methylene or propylene bridge. The silyl remainder is preferably selected from a group comprising dimethoxy methyl silyl, diethoxy methyl, dimethoxy ethyl silyl, diethoxy ethyl silyl, trimethoxy silyl and/or triethoxy silyl. The silane terminated polymers provided with a methylene or propylene bridge are also referred to as α-(silane) terminated ($C_1$-alkyl) or as γ-(silane) terminated ($C_3$-alkyl) polymers.

Silane terminated polymers formed from polyethylene glycol and/or polypropylene glycol (as alternative names for polyethylene oxide and/or polypropylene oxide) are produced through reactions thereof with suitable silyl remainders that have a reactive isocyanate group. These are referred to as isocyanate alkyl alkoxy silanes. If the silane terminated polymer is produced from polyurethane, a terminal cyanate group thereof can react with silyl-derivatives that have a reactive amino group, in particular a reactive secondary amino group. These derivatives are referred to as 2-amino alkyl alkoxy silanes.

The specified silane terminated polymers may be referred to as resins, and may be referred to, in particular, as pre-polymers, because these are used in the non-cross-linked state. Due to a cross-linking reaction of the silane terminated polymers in the intermediate layer 20, the at least one intermediate layer 20 cannot be fused after its completion, and only becomes soft, for example, when at least one asphalt upper layer 30 has been applied. The granulation that is to be applied to the at least one intermediate layer 20, e.g. aggregate or rubber granulate, can thus be advantageously applied thereto directly after applying the material for producing the intermediate layer 20, but can also, for example, be applied prior to applying the at least one asphalt upper layer 30 to the at least one intermediate layer 20. The alkoxy remainders, in particular methoxy, ethoxy and/or propoxy groups, hydrolyze upon contact with moisture, such that reactive silanols occur, which then either condense to form oligomeric siloxanes or, as intended, in particular according to the invention, react with the base layer 10 and/or the asphalt upper layer 30, and form solid covalent bonds.

Silane terminated polyurethanes as set forth in the present invention preferably have a polyoxy propylene spine, and at least one, two or more urethane groups between the two ends thereof and the silane groups therebetween, which form a urethane segment. Examples of silane terminated polyurethanes can be obtained commercially under the name Polymer ST, Evonik Hanse GmbH, Geesthacht, Germany. Examples of a silane terminated polyether having a polypropylene oxide base and/or a polyethylene oxide base are GENIOSIL STP E10, GENIOSIL WP1 or GENIOSIL WP2 of Wacker Chemie AG, Munich, Germany.

The material used for producing the at least one intermediate layer 20 can be distributed and processed on the at least one base layer, for example, by means of spraying, or scattering from buckets, by means of levelers or suchlike.

The at least one silane terminated polymer is preferably contained in the material in a quantity ranging from approx. 20% by weight to approx. 70% by weight, preferably in a quantity ranging from approx. 30% by weight to approx. 65% by weight, more preferably in a quantity ranging from approx. 35% by weight to approx. 60% by weight, and yet more preferably in a quantity ranging from approx. 40% by weight to approx. 60% by weight, in relation to the entire quantity of the material. Advantageously, the at least one silane terminated polymer has terminal methoxy, ethoxy and/or propoxy groups, wherein one, two or three such groups may be provided. Preferably two such groups are provided, and more preferably, two methoxy or two ethoxy groups are provided. The further molecular groups can be an alkyl group having one to twelve carbon atoms, when only one or two such groups are provided, preferably a methyl, ethyl or propyl group. The above definition of the silane terminated polymer having alkoxy groups relates to the pre-polymer, thus the non-cross-linked, or non-hydrolyzed polymer. The specified alkoxy groups are no longer, or only partially, contained in the completed traffic surface construction, depending on the degree of hydrolysis.

More advantageously, the material furthermore comprises at least one poly methacrylic acid ester. Advantageously, the ester group of the at least one poly methacrylic acid ester is formed from a remainder R having 2 to 20 carbon atoms, advantageously with a remainder R having 6 to 18 carbon atoms, more preferably with a remainder R having 10 to 14 carbon atoms. It is particularly preferred that an esterification of poly methacrylic acid occurs with linear alcohols, such that the remainder R is preferably linear and not branched. It is particularly preferred that an esterification occur with dodecanol.

The at least one poly methacrylic acid ester is advantageously comprised in the material in a quantity ranging from approx. 4% by weight to approx. 15% by weight, more preferably in a quantity ranging from approx. 6% by weight to approx. 14% by weight, even more preferably in a quantity ranging from approx. 7% by weight to approx. 12% by weight, in each case in relation to the entire quantity of the material.

Furthermore, the material advantageously comprises at least one filler and/or carbon black. The filler is advantageously selected from a group comprising powdered mineral fillers. It is particularly preferred that the filler be selected from a group comprising magnesium, talcum, and/or ground limestone. The at least one filler is advantageously comprised in the material in a quantity ranging from approx. 20% by weight to approx. 50% by weight, more preferably in a quantity ranging from approx. 25% by weight to approx. 45% by weight, in each case in relation to the entire quantity of the material. Carbon black is preferably comprised in the material in a quantity ranging from approx. 1% by weight to approx. 10% by weight, more preferably in a quantity ranging from approx. 3% by weight to approx. 7% by weight, in each case in relation to the entire quantity of the material.

Furthermore, the material can comprise at least one catalyst, selected from the group of primary, secondary or tertiary amines, or selected from a group comprising organic tin derivatives, in particular dibutyltin dilaurate. Depending on the silane terminated polymer that is used, aminosilanes can also function as catalysts, e.g. N-aminoethyl-aminopropyl-trimethoxy silane. In particular, with the use of silane terminated polymers, produced from polypropylene glycol and/or polyethylene glycol, having at least one, preferably exactly one, urethane segment, and having one methylene and/or propylene bridge, it may also be provided that no catalyst is used. In particular, those catalysts selected from a group comprising amino silanes and/or tin-based, in particular organic, catalysts may be used, in particular, as the catalysts, as described above. Advantageously, the catalyst is selected from a group comprising secondary amines. More preferably the catalyst is selected from a group comprising secondary amines having terminal hydroxy groups. It is particularly preferred that the catalyst is diethanolamine. The catalyst is preferably comprised therein in a quantity ranging from approx. 0.1% by weight to approx. 2% by weight, more preferably in a quantity ranging from approx. 0.2% by weight to 1.6% by weight, in each case in relation to the entire quantity of the material.

Moreover, the material can also comprise at least one softener. The at least one softener is advantageously selected from a group comprising phthalate ester, alkane sulfonic acid phenyl ester and/or polyether. A polyethylene glycol or polypropylene glycol is preferably used as the polyether, having a molecular weight in a range of between approx. 200 and approx. 15,000, preferably between approx. 500 and approx. 10,000, more preferably between 1,000 and 4,000. Softeners need only be provided, however, if the material does not have a suitable viscosity, in particular a relatively low viscosity, such that the material can be readily processed for the production of the intermediate layer. The at least one softener is advantageously comprised therein in a quantity ranging from approx. 0.1 to approx. 20% by weight, preferably in a quantity ranging from approx. 2% by weight to approx. 15% by weight, more preferably in a quantity ranging from approx. 5% by weight to approx. 15% by weight, in relation to the entire quantity of the material.

The material used in the traffic surface construction 5 according to the invention advantageously exhibits a dynamic viscosity in a range of approx. 0.5 Pa*s to approx. 25 Pa*s, more preferably in a range of approx. 4 Pa*s to approx. 20 Pa*s at a temperature of 23° C., in a range of 1 U/min. to 100 U/min., measured in accordance with the norm ISO 3219, at a shear rate of 20 $s^{-1}$. Advantageously the material used exhibits a thixotropic, and particularly preferably, self-leveling behavior. The material can also comprise at least one thixotropic agent thereby, preferably one selected from a group comprising pyrogenic silicic acid. The thixotropic agent can be added in a quantity ranging from approx. 0.05% by weight to approx. 10% by weight, more preferably in a range of approx. 1% by weight to approx. 8% by weight, in relation to the entire quantity of the material.

The at least one silane terminated polymer comprised in the material advantageously exhibits a dynamic viscosity in a range of approx. 0.2 Pa*s to approx. 20 Pa*s, more preferably in a range of approx. 0.5 Pa*s to approx. 13 Pa*s, measured at a temperature of 25° C. in accordance with DIN 51562.

Aside from the aforementioned additive catalysts, softeners, etc. the material can also comprise an additive selected from a group comprising water collectors, antioxidants, bonding agents, UV stabilizers and/or dyes or color pigments. It is particularly preferred that the material comprise at least one water collector thereby, selected from a group comprising alkoxy silanes and/or acryloxy silanes. Di- or tri-functional compounds of the specified type are particularly preferred thereby, particularly preferably di-functional α-meth acryloxy silanes and vinyl trimethoxy silane. The at least one water collector is added to the material in a quantity of approx. 0.05% by weight to approx. 5% by weight, more preferably in a quantity ranging from approx. 0.8% by weight to approx. 2.5% by weight, in relation to the entire quantity of the material. Insofar as a bonding agent is added, this is selected from a group comprising oligosiloxane or other organofunctional silanes, as well as amino silanes. In the case of amino silanes, these can simultaneously act as catalysts. Where at least one bonding agent is provided in the form of an amino silane, it is preferred that such a one is used as that described above in conjunction with the advantageous catalysts. The at least one bonding agent is advantageously comprised therein in a quantity ranging from approx. 0.5% by weigh to approx. 5% by weight, more preferably in a quantity ranging from approx. 0.8% by weight to approx. 2.5% by weight, in relation to the entire quantity of the material.

Insofar as the material comprises water collectors and/or bonding agents/catalysts, preferably such are selected that release neither methanol nor ethanol during a reaction. The material is advantageously self-hardening, wherein the self-hardening occurs through environmental moisture. Advantageously the hardening can, however, be accelerated by adding a starter agent.

A crack propagation resistance, in compliance with DIN 53515, of the hardened material of the at least one intermediate layer lies in a range of approx. 0.5 N/mm to approx. 15 N/mm, preferably in a range of approx. 1.8 N/mm to approx. 6 N/mm. A tensile strength, in accordance with ISO 527, of the hardened material lies in a range of approx. 0.2 $N/mm^2$ to approx. 8 $N/mm^2$, preferably in a range of approx. 0.5 $N/mm^2$ to approx. 7.5 $N/mm^2$. The expansion, in accordance with ISO 527, lies in a range of approx. 30% to approx. 1,000%, more preferably in a range of approx. 100% to approx. 700%, even more preferably in a range of approx. 200% to approx. 500%, wherein the values listed above describe the tear expansion. All parameters have been measured at 23° C. and 50% relative humidity in a 2 mm thick layer of the material. The elasticity module, measured in accordance with the norm for ISO 257, for the material, lies in a range of approx. 250 kPa to approx. 1,000 kPa.

The starter agent, which can advantageously be added to the material, is advantageously selected from a group comprising polymers of acetate. It is particularly preferred that the starter agent be selected from a group comprising polyvinyl acetate. More preferably, the polymer of acetate is selected from a group comprising copolymers of polyvinyl alcohol and polyvinyl acetate. Polyvinyl acetate advantageously forms, in copolymers, the main portion of the copolymers.

The starter agent can furthermore comprise, aside from the polymers of acetates, at least one organic carbonate. Advantageously, the organic carbonate is selected from a group comprising cyclical carbonates, and is, particularly preferably, propylene carbonate. More advantageously, the starter agent is formed from approx. 70% by weight to approx. 98% by weight of the polymers of acetates and 2% by weight to approx. 30% by weight of an organic carbonate, more preferably the polymer of acetate is added to the starter agent in a quantity ranging from approx. 85% by weight to approx. 95% by weight of a copolymer of polyvinyl alcohol and polyvinyl acetate as the main portion, and approx. 5% by weight to approx. 15% by weight of propylene carbonate, wherein the weights, in each case, are in relation to the entire quantity of the starter agent.

Particularly preferred materials for the production of the intermediate layer 20 comprise at least one silane terminated polymer, formed in a reaction of at least one polyethylene glycol and/or polypropylene glycol, with at least one silyl group, preferably an isocyanate alkyl alkoxy silane, in a quantity ranging from approx. 35% by weight to approx. 60% by weight, wherein it is particularly preferred that at least two silane terminated polymers are employed, furthermore comprising at least one softener, selected from the group of polyethers, in particular polyethylene glycol and/or polypropylene glycol, having a molecular weight in a range of between approx. 800 and approx. 4,000, in a quantity ranging from approx. 5% by weight to approx. 15% by weight, furthermore comprising, as filler, a powdered mineral filler, preferably talcum, in a quantity ranging from approx. 25% by weight to approx. 45% by weight, as well as other additives (water collectors, bonding agents, and catalysts) in a quantity ranging from a total of approx. 0.3% by weight to approx. 5% by weight, wherein the percentages by weight, in each case, relate to the entire quantity of the material.

The thickness of the at least one intermediate layer 20 of the traffic surface construction 5 according to the invention is advantageously between 1 mm and approx. 5 mm, more preferably between approx. 1.6 mm and 5 mm. Advantageously, aggregate and/or rubber granulate 40 are scattered over the at least one intermediate layer 20. Advantageously, the granulation used thereby exhibits a maximum grain size ranging from approx. ≥1 mm, preferably approx. ≥1 mm to approx. ≤8 mm, more preferably from approx. ≥2 mm to approx. ≤5 mm.

The thickness of the at least one asphalt upper layer 30 of the traffic surface construction according to the invention advantageously lies in a range of approx. 1 cm to approx. 6 cm, more preferably in a range of approx. 2 cm to approx. 3.5 cm. The layer thickness of the at least one base layer 10 of the traffic surface construction according to the invention lies advantageously in a range of approx. 5 cm to approx. 40 cm, more preferably in a range of approx. 10 cm to approx. 30 cm.

Furthermore, the at least one base layer 10 advantageously has slabs with an edge length of approx. ≥0.5 m to approx. ≤2.8 m, more preferably approx. ≤2.5 m.

It is further preferred that the at least one base layer 10, preferably exactly one concrete layer, is designed as a single-piece, seamless concrete surface as the traffic surface substructure. The concrete employed herein advantageously has only a limited stability in the stability classification of C25/30, and can advantageously be de-tensioned before applying the at least one intermediate layer, e.g. with a polygonal roller. Furthermore, the at least one base layer 10 advantageously comprises no reinforcements. Furthermore, the at least one base layer 10 advantageously comprises no fibers of any type. The aggregate of the concrete is advantageously selected from such having a maximum grain size of ≥4 mm. Gravel is preferably provided as the aggregate, but other rocks having an increased sensitivity to the alkali silicic acid reaction may be employed.

The cement content of the concrete used for the production of the at least one base layer 10 is less than 300 kg/m$^3$, and advantageously lies in a range of approx. 250 kg/m$^3$ to approx. 280 kg/m$^3$.

The surface of the at least one base layer 10, facing the at least one intermediate layer 20, is preferably notched. Target breaking points are created with the notching, which advantageously allow for shorter edge lengths of the slabs. The at least one base layer 10, advantageously, should be able to tear more frequently.

The concrete employed for the at least one base layer exhibits a stiff consistency, and can advantageously also be incorporated with an asphalt road paver, and subsequently rolled out.

A concrete such as that defined above for the at least one base layer 10, exhibits low material costs, and due to its incorporation by means of an asphalt road paver and the lack of seams, without the use of dowels and anchors, as well as the lack of the necessity of providing a surface texture, can be inexpensively produced.

The at least one base layer 10, or concrete, described above is covered by the intermediate layer 20. The intermediate layer 20 is capable thereby of bridging tears in the concrete, and exhibits elastic properties. As a result, the concrete and the underlying construction are durably protected from the ingress of water and possible erosion.

The at least one asphalt upper layer 30, advantageously exactly one asphalt surface layer, is applied to the at least one intermediate layer 20, advantageously exactly one intermediate layer 20. The asphalt can be, in particular, a melted asphalt thereby, in particular a melted asphalt having an open-pore surface. As the mix for the production of the asphalt upper, or surface, layer 30, a mix is advantageously employed that is known from WO 2010/089097 A1. The subject matter of WO 2010/089097 A1 is hereby incorporated in its entirety in the subject matter of the present invention. As a result, an asphalt mix is used that is self-sealing, similar to a melted asphalt, wherein the asphalt mix used in the specified document represents an entirely new, independent class of mixes. Other asphalts, melted asphalts, etc. can, however, also be used for forming the at least one asphalt upper layer. It is particularly preferred that an asphalt mix is used composed of grit, sand, filler and, in particular, a bitumen binder, as well as, optionally, additives, wherein the overall mass of all components amounts to 100% by mass, wherein the grit content, having an aggregate of ≥1 mm lies between 65% by mass and 80% by mass, the sand content of natural or crushed sand having a grain size of ≥0.063 mm and ≤2 mm lies between 2% by mass and 15% by mass, the filler content, having an aggregate size of ≤0.063 mm lies between 15% by mass and 19.5% by mass, and wherein the binder content lies between 6.8% by mass and 7.5% by mass.

Insofar as the term "approx." is used in the claims and the description of the present application, it is immediately clear to the targeted person skilled in the art thereby that the specified range limits are not rigid limits, but rather, slight deviations therefrom still fulfill the aims and purposes of the present invention. In particular, deviations of ±5%, more preferably ±2% from the given range limits are such that they fall within the scope of protection for the present invention.

The present invention furthermore relates to the use of a material that is defined in the claims, and in the description above, for the production of at least one intermediate layer 20 on at least one base layer 10 for the production of traffic surfaces.

These and further advantages of the traffic surface construction according to the invention shall be described in greater detail based on the following example of a subsequent finishing of an existing construction.

A triple layered traffic surface construction is produced, having a base layer 10 with a thickness of approx. 20 cm, an intermediate layer 20 with a thickness of approx. 2 mm, and an asphalt surface layer 30 with a thickness of approx. 2.5 cm.

An asphalt mix, such as that described in WO 2010/089097 A1, and defined above in the description, is used for the asphalt surface layer 30, which mix is low-noise and has an open-pore surface.

The intermediate layer 20 is produced from a material without the addition of a starter agent, wherein the material is composed of 52% by weight of a condensation product comprising ethoxy silane with polypropylene oxide, 10% by weight of a poly methacrylic acid ester, formed from poly methacrylic acid and dodecanol, having a remainder R with 12 carbon atoms, 0.5% by weight diethanolamine as a catalyst, 2% by weight carbon black and 35% by weight calcium carbonate in powdered form as the filler.

Alternatively, the intermediate layer 20 can be produced from a material having a silane terminated polyether in a mixture with another silane terminated polyether as the base, wherein the polyethers exhibit different viscosities. It is fundamentally advantageous in the present invention to employ mixtures of silane terminated polyethers, whether these have a polypropylene oxide base or a polyethylene oxide base, or both. In the alternative material for the intermediate layer, 30% by weight of a dimethyl oxy methyl silyl methyl carbamate terminated polyether (GENIOSIL STP E10) having a dynamic viscosity at 25° C. in accordance with DIN 51562 of 10 Pa*s, and 13% by weight of a likewise silyl methyl carbamate terminated polyether (GENIOSIL WP1) having a dynamic viscosity at 25° C. according to Brookfield of 0.7 Pa*s, mixed with 11% by weight of polypropylene glycol as a softener, having a molecular weight of 2,000, 42.5% by weight talcum as filler, 2% by weight of a water collector (Silquest Y-15866, Momentive Performance Materials Inc.) and 1.5% by weight of a bonding agent, which simultaneously serves as a catalyst (Silquest VX-25225) are mixed together.

The percent by weight information given above relates, in each case, to the entire quantity of the material.

The concrete is composed according to the following concrete recipe, based on 1.0 $m^3$ for the total volume: 350 kg cement CEM I 42.5 N, HeidelbergCement AG, Paderborn, 154 kg water, 555 kg sand 0/2 mm, 310 kg basalt grit 2/5 mm, 450 kg basalt grit 8/16 mm, 540 kg basalt grit 16/22 mm, 1.19 kg additive LPS A-94, as air pore former, manufacturer: Sika Deutschland GmbH, Stuttgart, and 1.5 kg additive Pantarhol 85 (VZ) as a retarder, manufacturer: Ha-Be Betonchemie GmbH & Co. KG, Hameln.

An original upper concrete layer is milled off to a depth of approx. 2.5 cm to approx. 3 cm. After the milling, the remaining concrete construction is provided with the material, in that this material is shaken out of a bucket and flattened with screens. Subsequently the intermediate layer 20 formed in this manner is strewn with coarse aggregate and rubber granulate 40 having a grain size ranging from approx. 2 mm to approx. 5 mm. As a result of the scattering of the granulate, an improved bond to the subsequently applied asphalt layer is obtained.

The materials as defined above have a processing and hardening time in a range of approx. 15 to approx. 20 minutes. If a starter agent is added, a greater quantity thereof will lead to respectively shorter processing times; the curing time for the material depends on the humidity, the moisture content of the concrete and/or the amount of starter agent added thereto. With an increased quantity of starter agent, and an increased moisture content in the concrete, the curing occurs at a respectively higher rate.

Thus, with the present invention a traffic surface construction is advantageously defined, which in this form is not yet known in the prior art, and allows, in particular, for the use of an inexpensive concrete for the production of the at least one base layer 10, while at the same time providing a substantially waterproof property through the specific material that is employed for the at least one intermediate layer 20.

The invention claimed is:

1. A traffic surface construction comprising at least one asphalt upper layer and at least one intermediate layer, which is applied to at least one base layer, wherein the at least one intermediate layer has a material with at least one silane terminated polymer wherein the at least one silane terminated polymer is selected from the group consisting of: polyethylene *oxide*, polypropylene oxide, polyethylene *oxide* including urethane segments, polypropylene oxide including urethane segments, [and/or] *and* polyurethane.

2. The traffic surface construction according to claim 1, wherein the at least one silane terminated polymer is present in a quantity ranging from 20% by weight to 70% by weight, in relation to an entire quantity of material.

3. The traffic surface construction according to claim 1, wherein the at least one silane terminated polymer has terminal methoxy, ethoxy and/or propoxy groups.

4. The traffic surface construction according to claim 1, further including at least one poly methacrylic acid ester.

5. The traffic surface construction according to claim 4, wherein the ester group is formed from a remainder R having 2 to 20 carbon atoms.

6. The traffic surface construction according to claim 4, wherein the at least one poly methacrylic acid ester is present in a quantity ranging from 4% by weight to 15% by weight, in relation to an entire quantity of material.

7. The traffic surface construction according to claim 1, further including at least one filler and/or carbon black.

8. The traffic surface construction according to claim 1, further including a starter agent.

9. The traffic surface construction according to claim 8, wherein the starter agent includes polymers of acetate.

10. The traffic surface construction according to claim 1, wherein a thickness of the at least one intermediate layer is between 1 mm and 5 mm.

11. The traffic surface construction according to claim 1, including an aggregate and/or rubber granulate applied over the at least one intermediate layer.

12. The traffic surface construction according to claim 11, wherein the aggregate has a maximum grain size ≥1 mm.

13. The traffic surface construction according to claim 1, wherein the at least one base layer includes slabs having an edge length that is less than 2.5 m.

* * * * *